(12) United States Patent
Kubota et al.

(10) Patent No.: US 10,913,370 B2
(45) Date of Patent: Feb. 9, 2021

(54) POWER SUPPLY SYSTEM AND METHOD OF OPERATING POWER SUPPLY BETWEEN POWER DISTRIBUTION BRANCH FOR HOUSEHOLD APPLIANCES AND CHARGING BRANCH FOR ELECTRIC VEHICLE

(71) Applicant: DELTA ELECTRONICS, INC., Taoyuan (TW)

(72) Inventors: Tadashi Kubota, Taoyuan (TW); Toru Kido, Taoyuan (TW); Jung-Yun Bair, Taoyuan (TW); Tsung-Yuan Wu, Taoyuan (TW); Mao-Tso Cheng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 194 days.

(21) Appl. No.: 15/679,700

(22) Filed: Aug. 17, 2017

(65) Prior Publication Data

US 2018/0264966 A1 Sep. 20, 2018

(30) Foreign Application Priority Data

Mar. 17, 2017 (TW) .............................. 106108856 A

(51) Int. Cl.
*B60L 53/14* (2019.01)
*B60L 11/18* (2006.01)
(Continued)

(52) U.S. Cl.
CPC ............ *B60L 53/14* (2019.02); *B60L 11/1844* (2013.01); *B60L 53/305* (2019.02); *B60L 53/63* (2019.02);
(Continued)

(58) Field of Classification Search
CPC .... B60L 11/1844; B60L 53/305; B60L 53/63; B60L 53/14; H02J 7/045; H02J 3/14;
(Continued)

(56) References Cited

U.S. PATENT DOCUMENTS

2011/0133693 A1* 6/2011 Lowenthal .......... B60L 11/1824
320/109
2012/0086397 A1 4/2012 Obayashi et al.
(Continued)

FOREIGN PATENT DOCUMENTS

CN 102447286 5/2012
CN 103138331 6/2013
(Continued)

OTHER PUBLICATIONS

Office Action dated Sep. 4, 2017 from corresponding application No. TW 106108856.
(Continued)

*Primary Examiner* — Drew A Dunn
*Assistant Examiner* — Sailesh Thapa
(74) *Attorney, Agent, or Firm* — Hauptman Ham, LLP

(57) ABSTRACT

A power supply system includes a power distribution branch, a charging branch, and a control unit. The power distribution branch receives a first current. The charging branch includes a charging unit, and the charging branch receives a second current to charge an electric vehicle through the charging unit. The control unit is connected to the charging unit, and receives a current signal of the first current consumed by the power distribution branch. The control unit calculates an adjustment value of the second current according to a variation value of the first current when the first current is varied. A sum of the first current and the second current is less than or equal to an upper-limit value of a total household current. The control unit produces
(Continued)

a charging command according to the adjustment value of the second current and provides the charging command to the charging unit.

16 Claims, 12 Drawing Sheets

(51) Int. Cl.
*H02J 3/14* (2006.01)
*H02J 7/04* (2006.01)
*B60L 53/30* (2019.01)
*B60L 53/63* (2019.01)
*H02J 7/00* (2006.01)
*G06Q 50/06* (2012.01)

(52) U.S. Cl.
CPC ............. *H02J 3/14* (2013.01); *H02J 7/0025* (2020.01); *H02J 7/0027* (2013.01); *H02J 7/045* (2013.01); *G06Q 50/06* (2013.01); *Y02B 70/30* (2013.01); *Y02B 70/3225* (2013.01); *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y04S 10/126* (2013.01); *Y04S 20/222* (2013.01); *Y04S 20/242* (2013.01)

(58) Field of Classification Search
CPC .......... H02J 3/144; H02J 7/0025; H02J 3/322; Y02B 70/3225; Y02B 70/3266; Y02E 60/721; Y02T 90/121; Y02T 90/128; Y02T 90/163; Y02T 10/7088; Y02T 10/7005; Y02T 90/14; Y04S 20/242; Y04S 10/126; Y04S 20/222; G06Q 50/06
See application file for complete search history.

(56) References Cited

U.S. PATENT DOCUMENTS

| | | | |
|---|---|---|---|
| 2013/0024035 A1* | 1/2013 | Ito | B60L 53/51 |
| | | | 700/291 |
| 2015/0248117 A1 | 9/2015 | Furuya et al. | |
| 2017/0036557 A1* | 2/2017 | Tsuchiya | B60L 11/1838 |
| 2017/0345107 A1* | 11/2017 | Hirata | G06Q 50/06 |
| 2018/0126860 A1* | 5/2018 | Weicker | B60L 53/665 |

FOREIGN PATENT DOCUMENTS

| | | | |
|---|---|---|---|
| JP | 2009-178031 | 8/2009 | |
| JP | 2013-48556 | 3/2013 | |
| JP | 2013-225971 | 10/2013 | |
| JP | 2014-14237 | 1/2014 | |
| JP | 2015-202050 | 11/2015 | |
| KR | 101587581 B1 * | 1/2016 | ............ B60L 53/665 |
| TW | I403069 | 7/2013 | |
| WO | WO-2013144947 A2 * | 10/2013 | ................ H02J 3/14 |

OTHER PUBLICATIONS

Office Action dated Aug. 21, 2018 from corresponding application No. JP 2017-121539.

* cited by examiner

POWER SUPPLY SYSTEM AND METHOD OF OPERATING POWER SUPPLY BETWEEN POWER DISTRIBUTION BRANCH FOR HOUSEHOLD APPLIANCES AND CHARGING BRANCH FOR ELECTRIC VEHICLE

BACKGROUND

Technical Field

The present invention relates to a power supply system and a method of operating the same, and more particularly to a power supply system having a power distribution branch for household appliances and a charging branch for an electric vehicle and a method of operating the same.

Description of Related Art

In recent years, relevant issues, such as the balance between environmental protection and energy demand have been paid more attention due to increasing demand for petrochemical fuels and raising electricity prices. In the transport, the traditional vehicles use petrochemical fuels as power sources to cause significant impact on the environment. Therefore, the development of electric vehicles is a sustainable win-win solution for environmental protection and energy demand.

The existing household charging unit for electric vehicles does not provide functions of both monitoring the power consumption of household appliances and controlling a charging current of the charging unit. Once the power consumption of household appliances exceeds the pre-defined limit, the circuit breaker corresponding to the household appliance which draws the excessive current is disconnected for protection. Moreover, the electric power company charges large amount of money to the over power consumption exceeding the contract capacity. Accordingly, it is a trend that the household power supply system capable of charging electric vehicles includes functions of monitoring and controlling the power consumption of household appliances and the charging current of the charging unit in the future.

Refer to FIG. 1, which shows a schematic circuit block diagram of a conventional power supply system. The power supply system 100A provides functions of monitoring the power consumption of a plurality of household appliances and monitoring a charging current (charging power) provided from a charging unit 64A for charging an electric vehicle 400A through a control unit 80A. The power supply system 100A includes at least two current measurement unit 82A, 82B to measure the power consumption of the electric vehicle 400A since the power consumption of the electric vehicle 400A must be considered aside from the power consumption of household appliances, thus increasing extra costs of the current measurement unit. Also, in the power supply system 100A, the charging unit 64A is connected to a circuit breaking unit 42A. The circuit breaking unit 42A is disconnected when a sum of the power consumption of the household appliances and the power consumption of the charging unit 64A exceeds the contract capacity if the excessive charging power fails to be controlled.

SUMMARY

In order to solve the above-mentioned problems, the present invention provides a power supply system. Accordingly, the power supply system includes a power distribution branch, a charging branch, and a control unit. The power distribution branch receives a first current. The charging branch includes a charging unit, and the charging branch receives a second current to charge an electric vehicle through the charging unit. The control unit is connected to the charging unit, and receives a current signal of the first current consumed by the power distribution branch. The control unit calculates an adjustment value of the second current according to a variation value of the first current when the first current is varied. A sum of the first current and the second current is less than or equal to an upper-limit value of a total household current. The control unit produces a charging command according to the adjustment value of the second current and provides the charging command to the charging unit.

In one embodiment, the control unit calculates the second current by subtracting the first current from the upper-limit value of the total household current, and transmits the charging command corresponding to the second current to the charging unit.

In one embodiment, the control unit directly provides the charging command to correspondingly adjust the second current according to the variation value of the first current when the control unit receives that the first current consumed by the power distribution branch is varied.

In one embodiment, the charging command is a control signal for adjusting the charging unit, and the charging unit adjusts the second current according to the control signal.

In one embodiment, when the first current becomes larger, the control unit outputs the charging command corresponding to the control signal to control the charging unit for decreasing the second current; when the first current becomes smaller, the control unit outputs the charging command corresponding to the control signal to control the charging unit for increasing the second current.

In one embodiment, a delay time is defined as a time period from a varied time point to a completed time point. The first current starts to vary at the varied time point and the second current is completely adjusted at the completed time point. When the first current becomes larger or smaller, the charging unit decreases or increases the second current within the delay time.

In one embodiment, the power distribution branch includes a first circuit breaking unit and a plurality of third circuit breaking units connected to the first circuit breaking unit; the charging branch includes a second circuit breaking unit; when a current flowing through at least one of the third circuit breaking units is excessive, the at least one third circuit breaking unit is disconnected.

In one embodiment, the power supply system further includes a first power distribution panel and a second power distribution panel. The first power distribution panel contains the first circuit breaking unit and the third circuit breaking units. The second power distribution panel contains the second circuit breaking unit.

In one embodiment, the control unit is contained in the second power distribution panel or integrated into the charging unit.

In one embodiment, the power supply system further includes a main circuit breaking unit. The main circuit breaking unit is connected to the first circuit breaking unit and the second circuit breaking unit, and receives the total household current. The main circuit breaking unit delivers the total household current to the power distribution branch and the charging branch when the main circuit breaking unit is connected.

In one embodiment, the power supply system further includes a current measurement unit. The current measurement unit is connected to the control unit. The control unit receives a current signal of the first current in the power distribution branch by the current measurement unit.

In one embodiment, the control unit outwardly transmits information stored in the control unit through a transmission unit; or the control unit is externally monitored through the transmission unit.

In one embodiment, the power supply system further includes a renewable energy unit. The renewable energy unit is connected to the power distribution branch.

In order to solve the above-mentioned problems, the present invention provides a method of operating a power supply system. Accordingly, the power supply system delivers a first current to a power distribution branch and delivers a second current to a charging branch. A sum of the first current and the second current is less than or equal to an upper-limit value of a total household current. The method includes steps of: (a) receiving a current signal of the first current by a control unit; (b) producing a charging command by subtracting the first current from the upper-limit value of a total household current by the control unit, wherein the charging command is corresponding to the second current; and (c) calculating an adjustment value of the second current according to a variation value of the first current by the control unit when the first current is varied, and providing the charging command to adjust the second current.

In one embodiment, the step (c) further includes a step of: (c1) directly providing the charging command to correspondingly adjust the second current according to the variation value of the first current by the control unit. The charging command is a control signal for adjusting a charging unit of the charging branch.

In one embodiment, the step (c1) further includes a step of: (c2) outputting the charging command corresponding to the control signal to control the charging unit by the control unit for decreasing the second current when the first current becomes larger; outputting the charging command corresponding to the control signal to control the charging unit by the control unit for increasing the second current when the first current becomes smaller.

In one embodiment, the step (c2) further includes a step of: (c3) defining a delay time as a time period from a varied time point to a completed time point, wherein the first current starts to vary at the varied time point and the second current is completely adjusted at the completed time point.

It is to be understood that both the foregoing general description and the following detailed description are exemplary, and are intended to provide further explanation of the present invention as claimed. Other advantages and features of the present invention will be apparent from the following description, drawings and claims.

BRIEF DESCRIPTION OF DRAWING

The present invention can be more fully understood by reading the following detailed descriptions of the embodiments, with reference made to the accompanying drawings as follows.

DETAILED DESCRIPTION

Figure 1:
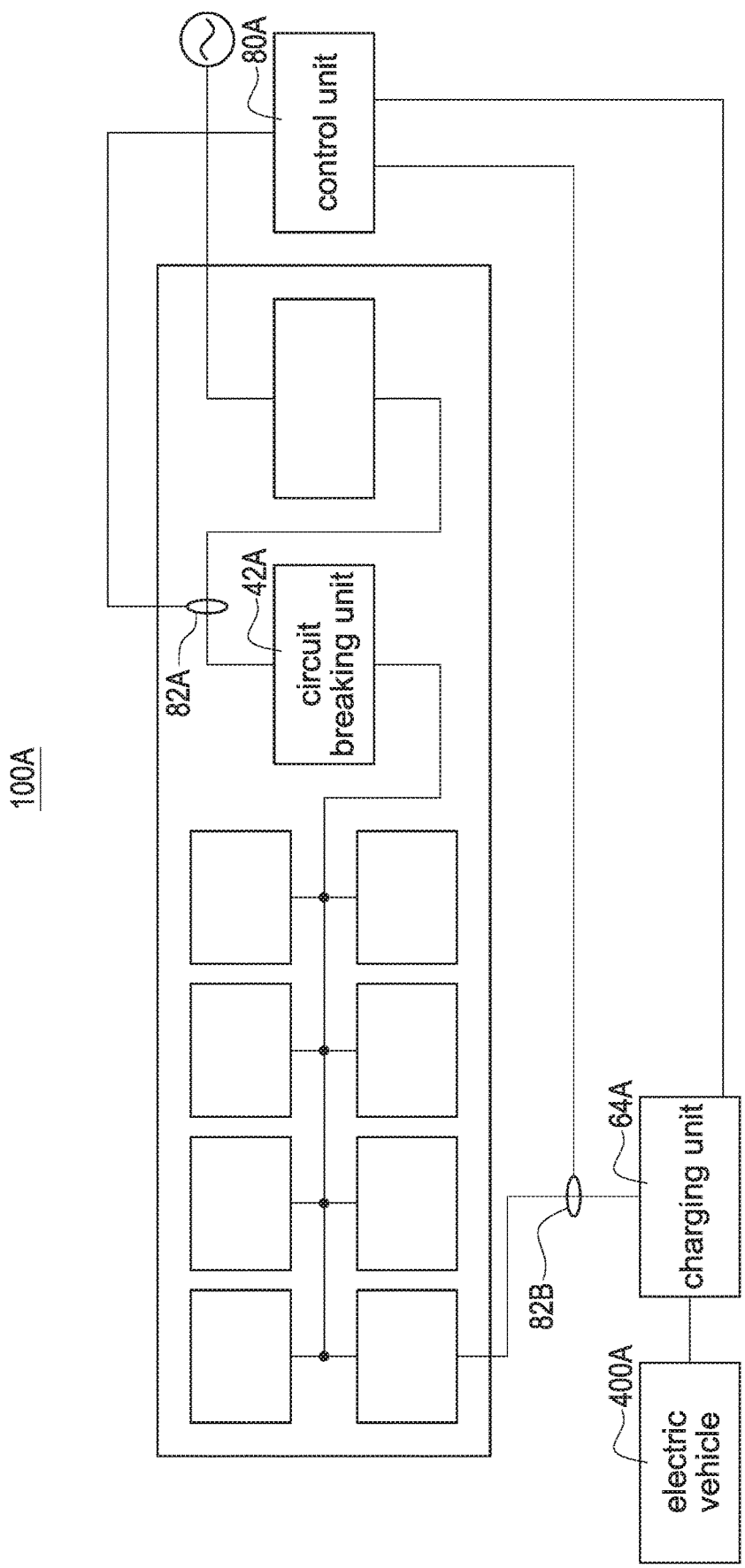
FIG. 1 shows a schematic circuit block diagram of a conventional power supply system.

Reference will now be made to the drawing figures to describe the present invention in detail. It will be understood that the drawing figures and exemplified embodiments of present invention are not limited to the details thereof.

Figure 2A:
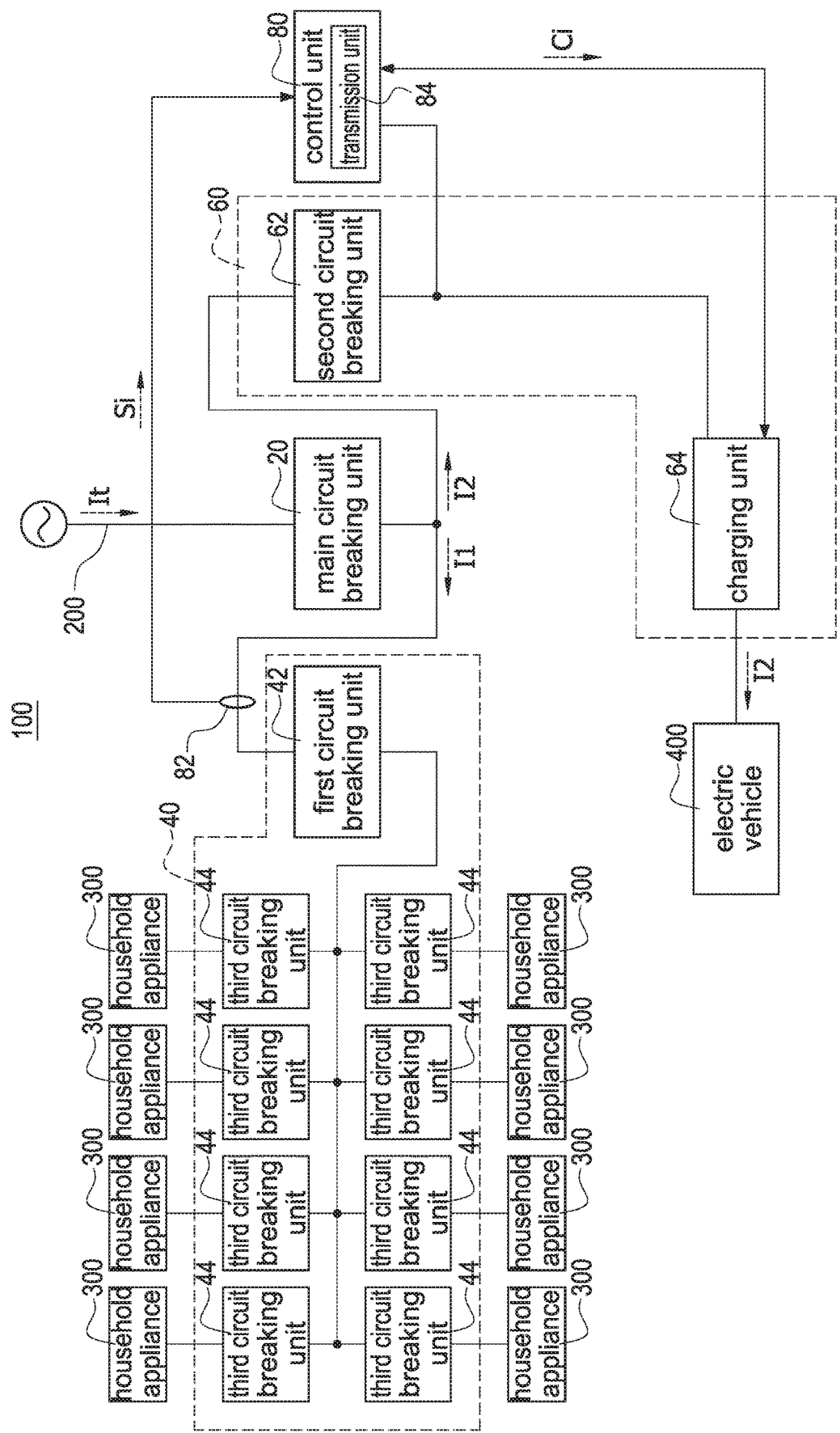
FIG. 2A shows a schematic circuit block diagram of a power supply system according to a first embodiment of the present invention.

Refer to FIG. 2A, which shows a schematic circuit block diagram of a power supply system according to a first embodiment of the present invention. The power supply system 100 receives a total household current It transmitted through an external line 200. The total household current It is supplied to a plurality of household appliances 300 and an electric vehicle 400. The household provides space configuration including compartments, space of installing the power supplying system, and/or other space configurations for family members or people. In particular, the total household current It is limited to below an upper-limit (maximum) power of the contract capacity signed with the electric power company to avoid expensive electricity bills. The upper-limit (maximum) power is, for example but not limited to, 60-ampere or 70-ampere upper-limit current of the contract power Iu. The power supply system 100 includes a main circuit breaking unit 20, a power distribution branch 40, a charging branch 60, and a control unit 80. The main circuit breaking unit 20 is connected to the external line 200, the power distribution branch 40, and the charging branch 60. The main circuit breaking unit 20 receives the total household current It. When the total household current It exceeds the upper-limit current of the contract power Iu to persist a predetermined time, the main circuit breaking unit 20 is disconnected (turned off) to protect the back-end power distribution branch 40 and the charging branch 60. The power distribution branch 40 is a branch for providing household electricity so that the power distribution branch 40 receives a first current I1 of the total household current It and provides the first current I1 to the household appliances 300. The power distribution branch 40 includes a first circuit breaking unit 42 and a plurality of third circuit breaking units 44. The first circuit breaking unit 42 is connected between the main circuit breaking unit 20 and the third circuit breaking units 44. The third circuit breaking units 44 are connected to the household appliances 300, such as household electronic products. When the power distribution branch 40 detects a leakage current, the first circuit breaking unit 42 is disconnected (turned off) to protect the back-end household appliances 300 and its user. The power distribution branch 40 draws the first current I1 of the total household current It to supply the required power electricity to the household appliances 300. When a current drawn by at least one of the household appliances 300 is excessive, the at least one of the third circuit breaking units 44 corresponding to the household appliance 300 is disconnected (turned off) to protect the back-end household appliance 300 which draws the excessive current. In this embodiment, the total household current It may be a three-phase current or a single-phase current.

The charging branch 60 is a branch for charging the electric vehicle 400, such as a vehicle car, a vehicle motorcycle, or a vehicle bicycle. The charging branch 60 receives a second current I2 of the total household current It to supply the electric vehicle 400. The charging branch 60 includes a second circuit breaking unit 62 and a charging unit 64. The second circuit breaking unit 62 is connected between the main circuit breaking unit 20 and the charging unit 64, and the charging unit 64 is connected to the electric vehicle 400. The second current I2 is delivered to the electric vehicle 400 through the charging unit 64 for charging the electric vehicle 400. When the charging branch 60 detects a leakage current, the second circuit breaking unit 62 is disconnected (turned off) to protect the back-end electric vehicle 400 and its user.

Moreover, the total household current It is limited to below an upper-limit (maximum) power of the contract capacity signed with the electric power company. Therefore, a sum of the first current I1 and the second current I2, namely the total household current It, is limited to less than or equal to the upper-limit current of the contract power Iu. Accordingly, the power supply system 100 of the present invention is provided to adjust the second current I2 according to the first current I1 consumed by the household appliances 300 so as to avoid exceeding the upper-limit current of the contract power Iu resulted in overloading electricity. As shown in FIG. 2A, the power supply system 100 further includes a current measurement unit 82. The current measurement unit 82 is connected to the control unit 80 and coupled to the power distribution branch 40. The current measurement unit 82 measures a current signal Si of the first current I1 flowing to the power distribution branch 40. The control unit 80 receives the current signal Si of the first current I1 to receive a current value of the first current I1. The control unit 80 is connected to the charging unit 64 and outputs a charging command Ci to the charging unit 64. More specifically, the control unit 80 is connected to an output path of the second circuit breaking unit 62, and is further connected to the charging unit 64 through a charging communication wire so that the charging command Ci is transmitted from the control unit 80 to the charging unit 64 through the charging communication wire. The charging command Ci is a control signal for adjusting the second current I2. In particular, the charging unit 64 adjusts the second current I2 according to the control signal transmitted from the control unit 80 to the charging unit 64. The control unit 80 calculates the second current I2 by subtracting the first current I1 from the upper-limit current of the contract power Iu, thus acquiring the charging command Ci corresponding to the second current I2. Also, the control unit 80 provides the charging command Ci to the charging unit 64. When the control unit 80 receives that the first current I1 is varied according to the current signal Si, the control unit 80 calculates an adjustment value of the second current I2 according to the variation value of the first current I1. The control unit 80 produces the charging command Ci according to the adjustment value of the second current I2 and transmits the charging command Ci to the charging unit 64. The second current I2 is adjusted to increase or decrease according to the charging command Ci by the control unit 80 as the first current I1 is changed (varied). More specifically, as shown in FIG. 2A, the control unit 80 is, but not limited to, connected to an output path of the second circuit breaking unit 62 to receive the required power electricity. In other words, the control unit 80 may be connected to an input path of the second circuit breaking unit 62 to receive the required power electricity or the control unit 80 may be supplied the required power electricity by other power supply units. In addition, the charging unit 64 connected to the electric vehicle 400 can provide a control signal such as a CPLT (control pilot) signal to control the electric vehicle 400 as well as supply the second current I2 to charge the electric vehicle 400. Therefore, the electric vehicle 400 is charged with a charging current by the charging unit 64 and the charging current is controlled by a duty cycle of the control signal. With reference again to FIG. 2A, the control unit 80 further includes a transmission unit 84. The control unit 80 outwardly transmits information stored in the control unit 80 through the transmission unit 84. Also, an external device may externally monitor the control unit 80 through the transmission unit 84. The transmission unit 80 can communicate with external interfaces or external devices, such as mobile phones or computers for data transmission, such as mobile phones or computers in a wired manner (for example, network lines or transmission lines) or a wireless manner (for example, WiFi, RF, or Bluetooth). The user may realize and monitor use conditions of the power supply system 100 through external interfaces or external devices (not shown). For example, but not limited to, current values of all branch, conditions of all circuit breaking units, and charging statuses of the electric vehicles 400. The transmission unit 84 may be, but not limited to, installed inside the control unit 80. Alternatively, the transmission unit 84 may be installed outside the control unit 80 and be connected to the control unit 80.

As shown in FIG. 2A, the power distribution branch 40 and the charging branch 60 of the power supply system 100 are separately configured so as to effectively control the total power consumption of the power distribution branch 40. Therefore, the power consumption of the charging branch 60 can be adjusted according to the total power consumption of the power distribution branch 40. When the main circuit breaking unit 20 is in a connection state, the power supply system 100 supplies total household current It to the power distribution branch 40 and the charging branch 60. Accordingly, a mathematical relationship between the first current IL the second current I2, and the upper-limit current of the contract power Iu is:

$$I_2 \leq I_u - I_1 \tag{1}$$

When the total household current It is supplied to the power supply system 100, the household appliances 300 draw the first current I1 through the power distribution branch 40 and the electric vehicle 400 draws the second current I2 through the charging branch 60. The control unit 80 receives the current signal Si of the first current I1 measured by the current measurement unit 82 to receive the current value of the first current I1. The control unit 80 calculates the adjustment value of the second current I2 according to the variation value of the first current I1. The control unit 80 produces the charging command Ci according to the adjustment value of the second current I2 and transmits the charging command Ci to the charging unit 64 to adjust the second current I2. When the first current I1 becomes larger, the control unit 80 outputs the charging command Ci corresponding to the control signal to control the charging unit 64 for decreasing the second current I2. On the contrary, the control unit 80 outputs the charging command Ci corresponding to the control signal to control the charging unit 64 for increasing the second current I2 when the first current I1 becomes smaller.

After the control unit 80 receives the current signal Si of the first current I1 and receives that the first current I1 is varied, the control unit 80 calculates the adjustment value of the second current I2 according to the above-mentioned formula (1). Afterward, the control unit 80 produces the charging command Ci according to the adjustment value of the second current I2 and then transmits the charging command Ci to the charging unit 64. Therefore, the control unit 80 can directly provide the charging command Ci corresponding to the adjustment value of the second current I2 to charge the electric vehicle 400 without confirming the previous charging command to the charging unit 64, thus significantly increasing charging efficiency due to the reduction of communication time between the control unit 80 and the charging unit 64.

With reference also to FIG. 2A, the power distribution branch 40 and the charging branch 60 do not affect each other since the power distribution branch 40 and the charging branch 60 of the power supply system 100 are separately configured. In order words, if one of the branches is disconnected, the other branch still normally supplies power electricity. More specifically, when the first circuit breaking unit 42 is disconnected since the power distribution branch 40 detects a leakage current, the second circuit breaking unit 62 is still connected so that the second current I2 continuously charges the electric vehicle 400. On the contrary, when the second circuit breaking unit 62 is disconnected since the charging branch 60 detects a leakage current, the first circuit breaking unit 42 is still connected so that the first current I1 continuously supplies the household appliances 300. In one embodiment, the first circuit breaking unit 42 and the second circuit breaking unit 62 are, for example but not limited to, earth-leakage circuit breakers with a leakage detection function.

Figure 2B:
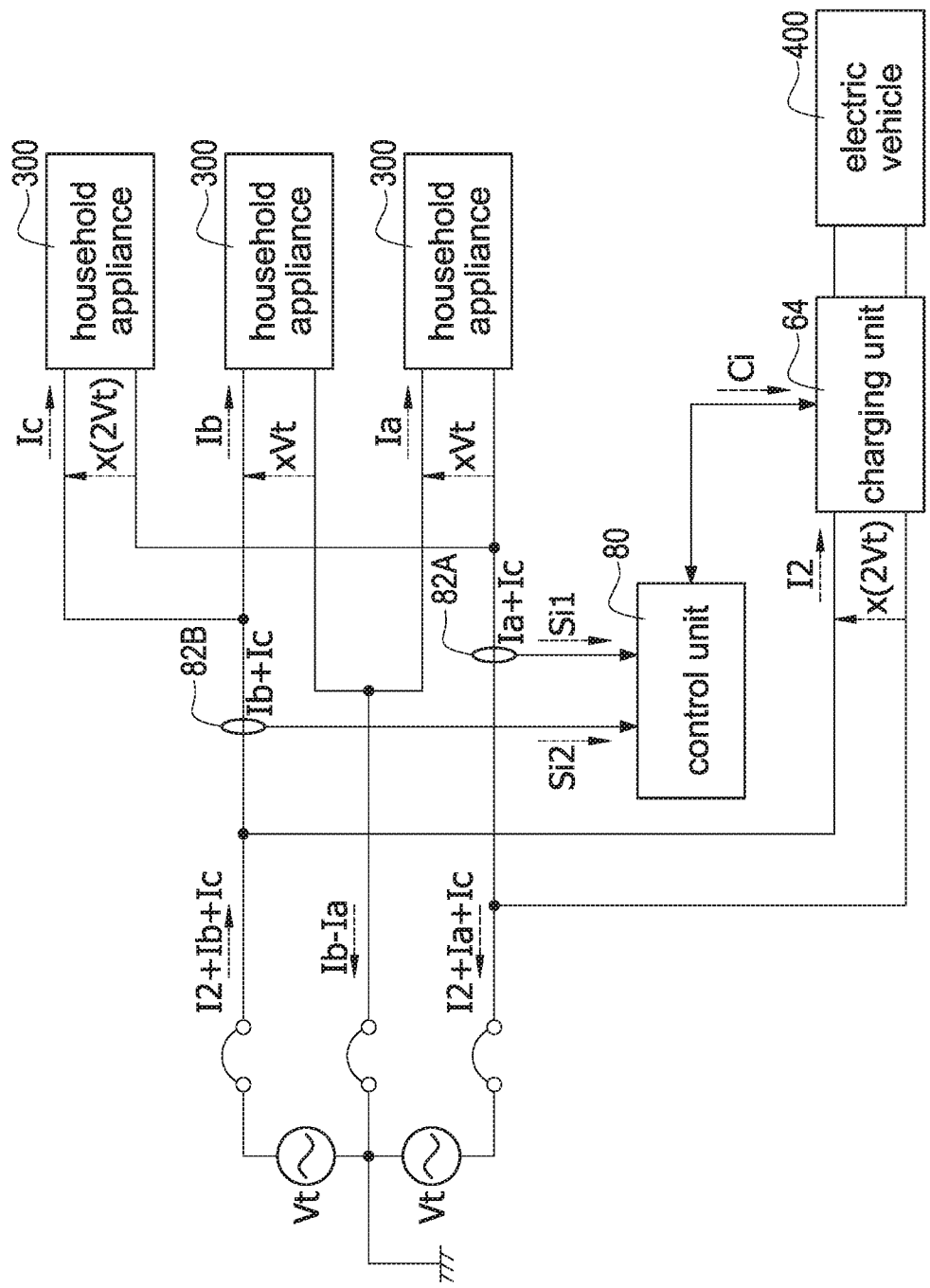
FIG. 2B shows a schematic circuit diagram of the power supply system according to the first embodiment of the present invention.

Refer to FIG. 2B, which shows a schematic circuit diagram of the power supply system according to the first embodiment of the present invention. For example, the power distribution branch 40 outputs the first current I1 to supply power electricity to three household appliances 300. In addition, the electric vehicle 400 is charged by the second current I2. The three household appliances 300 draw currents Ia, Ib, Ic, respectively. The control unit 80 receives the current signal Si of the first current I1 measured by the current measurement units 82A, 82B to receive the current value of the first current I1. Nowadays, the electric power companies in Japan mainly classify the contract capacity into two categories: (1) the upper-limit current of the contract power Iu is applied to places where power consumption is less than or equal to 60 amperes; (2) the upper-limit current of the contract power Iu is applied to places where power consumption is greater than 70 amperes. Therefore, power calculation formulas corresponding to the two categories are given as follows.

(1) For the upper-limit current of the contract power Iu applied to places where power consumption is less than or equal to 60 amperes:

$$V_t \cdot I_{contract} \geq xV_t \cdot I_a + xV_t \cdot I_b + x(2V_t) \cdot I_c + x(2V_t) \cdot I_2 \tag{2}$$

where Vt is an AC single-phase input voltage, I_contract is a contract current, and x is an error range (usually between 0.9 and 1.1).

The formula (2) is further derived as follows:

$$I_2 \leq \frac{\frac{I_{contract}}{x} - (I_a + I_c) - (I_b + I_c)}{2} \tag{3}$$

where $$\frac{I_{contract}}{x}$$

is an upper-limit current of the contract power Iu, (Ia+Ic) is a current measured by the current measurement unit 82A, and (Ib+Ic) is a current measured by the current measurement unit 82B. The control unit 80 receives the current signals Si1, Si2 from the current measurement units 82A, 82B to produce the charging command Ci and provides the charging command Ci to the charging unit 64 for adjusting the second current I2. Therefore, the second current I2 can be calculated according to the formula (3) for the upper-limit current of the contract power Iu applied to places where power consumption is less than or equal to 60 amperes.

(2) For the upper-limit current of the contract power Iu applied to places where power consumption is greater than 70 amperes:

$$I2 \leq I\_shutdown - \max[(Ia+Ic),(Ib+Ic)] \tag{4}$$

where is I_shutdown is a breaking current, (Ia+Ic) is a current measured by the current measurement unit 82A, and (Ib+Ic) is a current measured by the current measurement unit 82B. Therefore, the formula (4) is satisfied only if the second current I2 is less than or equal to a current acquired by subtracting the maximum of (Ia+Ic) and (Ib+Ic) from the breaking current. The control unit 80 receives the current signals Si1, Si2 from the current measurement units 82A, 82B to produce the charging command Ci and provides the charging command Ci to the charging unit 64 for adjusting the second current I2. Therefore, the second current I2 can be calculated according to the formula (5) for the upper-limit current of the contract power Iu applied to places where power consumption is greater than 70 amperes. If the current measured by the current measurement unit 82A, namely the current (Ia+Ic) or the current measured by the current measurement unit 82B, namely the current (Ib+Ic), the second current I2 is set to zero. In particular, the upper-limit current of the contract power Iu is applied to places where power consumption is less than or equal to 60 amperes or is applied to places where power consumption is greater than 70 amperes are exemplifications, and the actual upper-limit current of the contract power Iu and the second current I2 can be varied depending on wire configurations and/or contract capacity.

Figure 3:
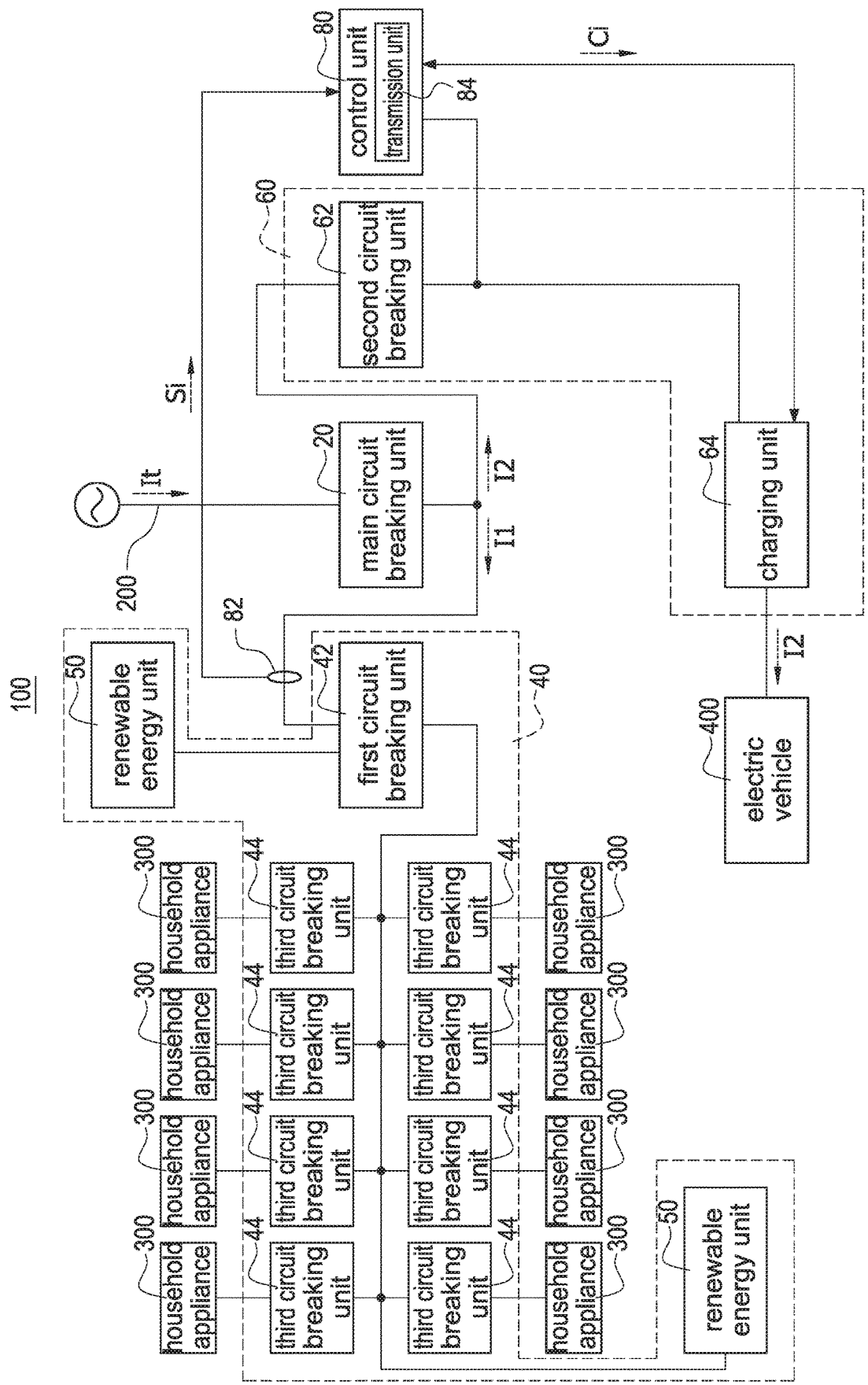
FIG. 3 shows a schematic circuit block diagram of the power supply system according to a second embodiment of the present invention.

Refer to FIG. 3, which shows a schematic circuit block diagram of the power supply system according to a second embodiment of the present invention. The major difference between the first embodiment in the FIG. 2A and the second embodiment in the FIG. 3 is that the power supply system 100 of the later further includes a renewable energy unit 50. The renewable energy unit 50 is connected to the power distribution branch 40 and supplies current to the power distribution unit 40. Also, the renewable energy unit 50 can feed current (power) back to a utility grid through the power distribution branch 40. The renewable energy unit 50 may be connected to an input side or an output side of the first circuit breaking unit 42. The renewable energy unit 50 can individually provide the required current (power) to the household appliances 300 or jointly provide the required current (power) to the household appliances 300 with the first current I1. Once the fed-back current (power) is detected, Ia+Ic=0 and Ib+Ic=0 are satisfied in the formula (3) and formula (4).

Figure 4:
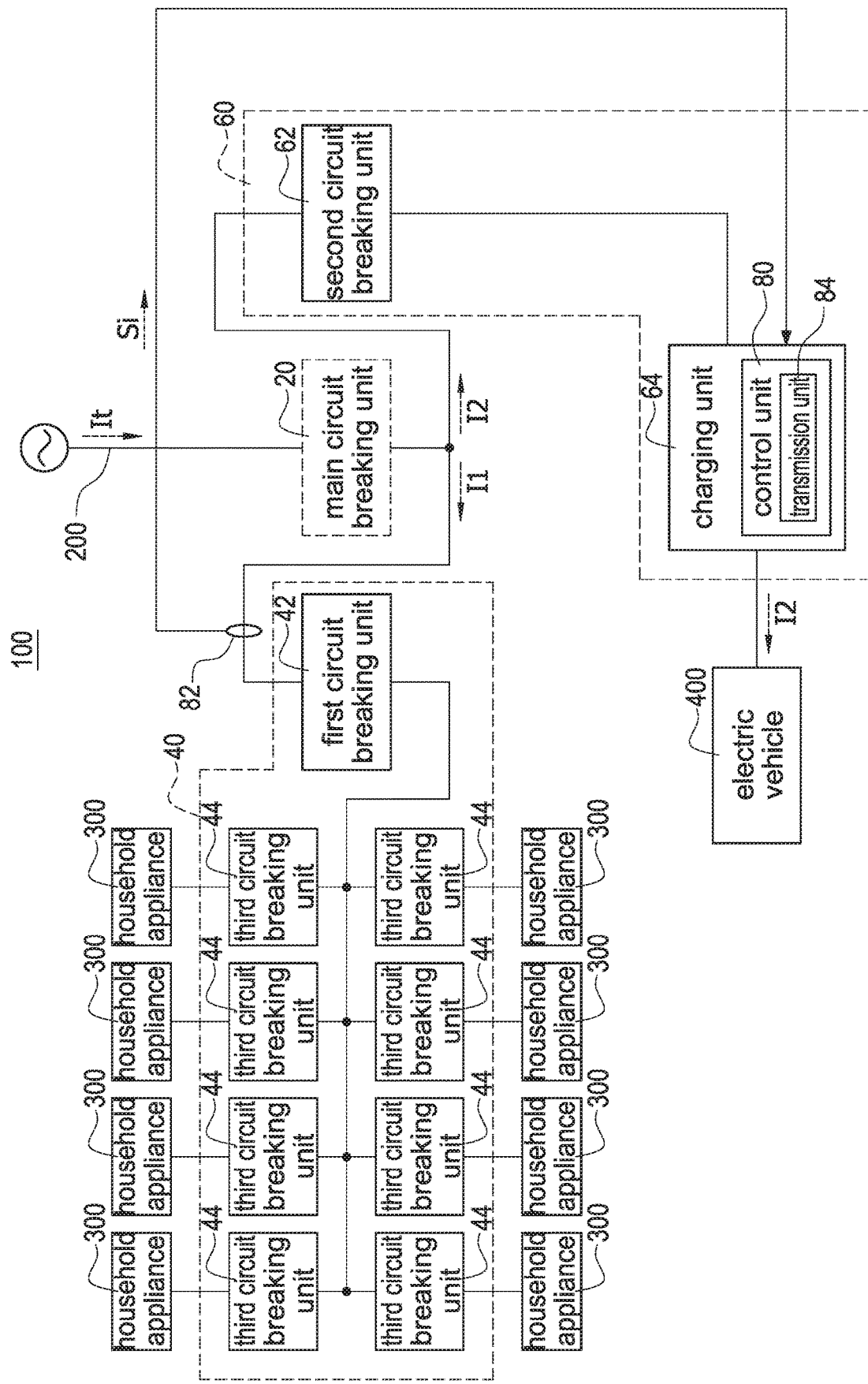
FIG. 4 shows a schematic circuit block diagram of the power supply system according to a third embodiment of the present invention.

Refer to FIG. 4, which shows a schematic circuit block diagram of the power supply system according to a third embodiment of the present invention. The major difference between above-mentioned two embodiments in the FIG. 2A, FIG. 3 and the third embodiment in the FIG. 4 is that the power supply system 100 of the later does not include the main circuit breaking unit 20 and the control unit 80 is integrated into the charging unit 64. In general, the utility grid is divided into a traditional electric grid and a smart electric grid. When the external line 200 is the smart electric grid, the external line 200 includes a smart meter with a circuit breaker, which plays a role as the main circuit breaking unit 20. In other words, the power supply system 100 does not involve the main circuit breaking unit 20 when the external line 200 is the smart electric grid. As shown in FIG. 4, the control unit 80 inside the charging unit 64 receives the current signal Si of the first current I1 measured by the current measurement unit 82 to receive the current value of the first current I1 and adjusts the duty cycle of the control signal for charging the electric vehicle 400. The charging unit 64 outwardly transmits information stored in the control unit 80 through the transmission unit 84. Also, an external device may externally monitor the control unit 80 through the transmission unit 84. In particular, the main circuit breaking unit 20, the renewable energy unit 50, or the control unit 80 can be applied among different embodiments.

Figure 5A:
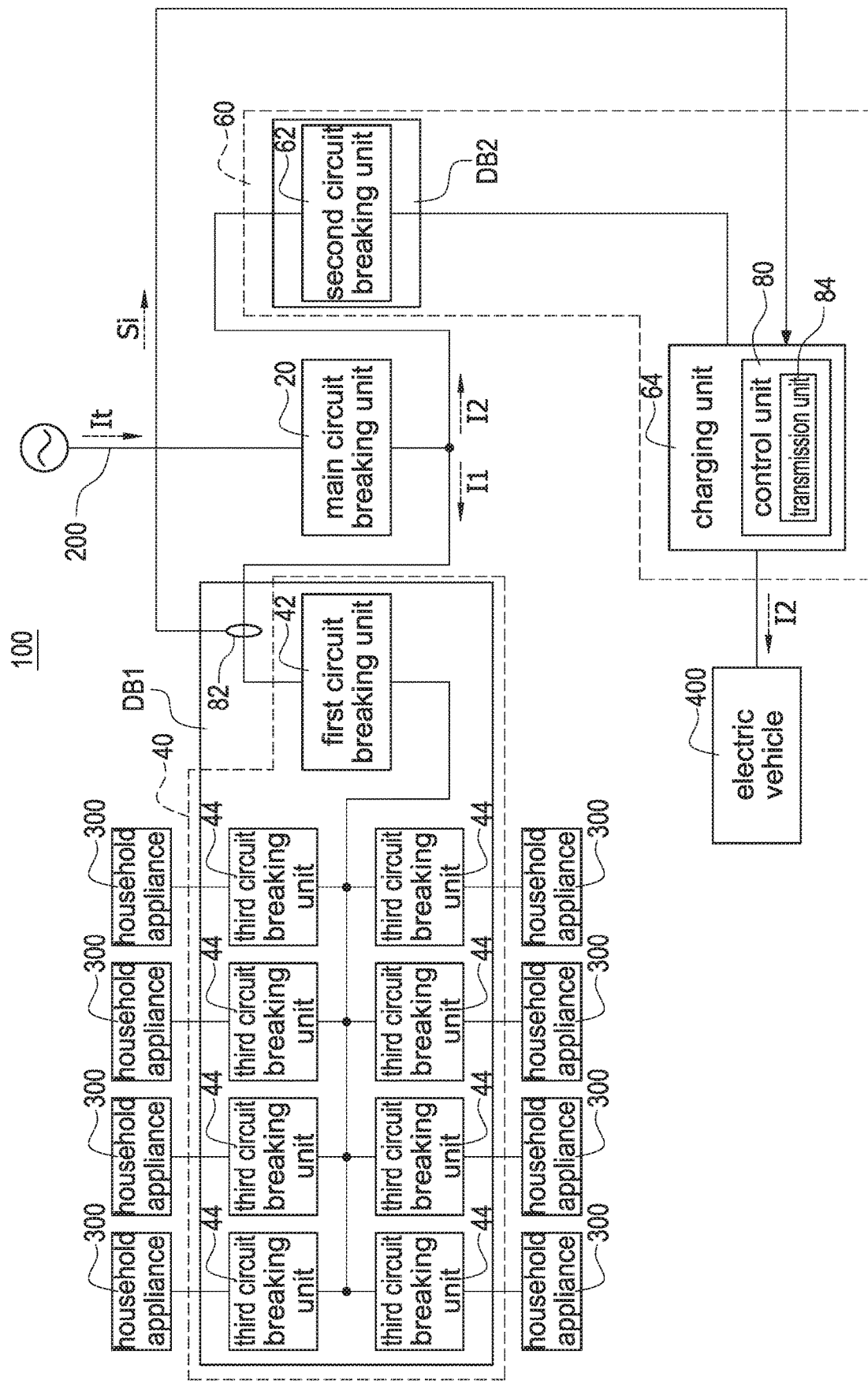
FIG. 5A shows a schematic structural block diagram of the power supply system according to the first embodiment of the present invention.
Figure 5B:
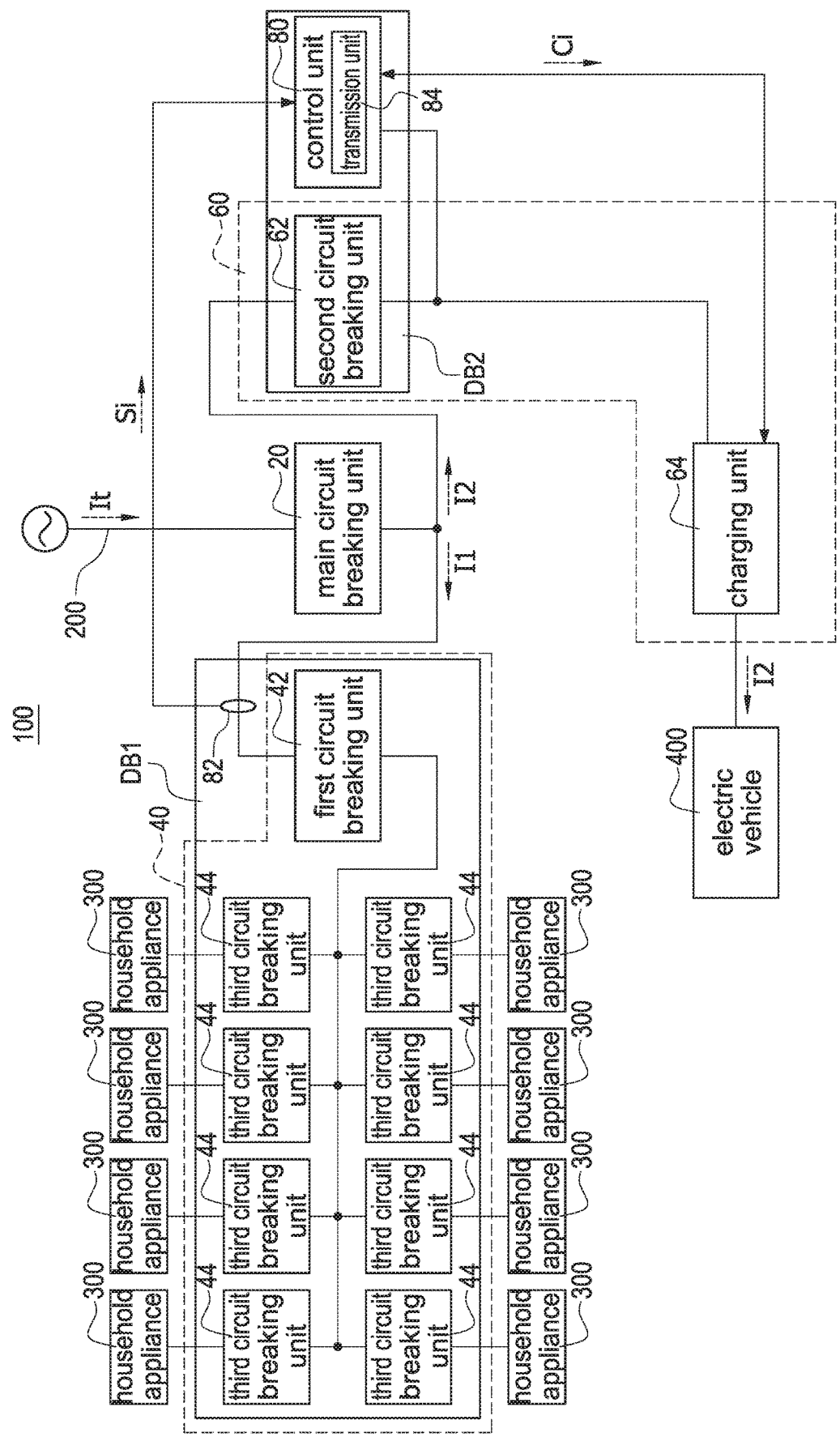
FIG. 5B shows a schematic structural block diagram of the power supply system according to the second embodiment of the present invention.

Refer to FIG. 5A, which shows a schematic structural block diagram of the power supply system according to the first embodiment of the present invention. The control unit 80 is integrated into the charging unit 64. The power supply system 100 includes a first power distribution panel DB1 and a second power distribution panel DB2. The first power distribution panel DB1 is used to contain the first circuit breaking unit 42 and the third circuit breaking units 44. The second power distribution panel DB2 is used to contain the second circuit breaking unit 62. The first power distribution panel DB1 and the second power distribution panel DB2 are used to separate the first circuit breaking unit 42 in the power distribution branch 40 and the second circuit breaking unit 62 in the charging branch 60 so as to easily determine the power distribution branch 40 or the charging branch 60 of the power supply system 100 is abnormal. Refer to FIG. 5B, which shows a schematic structural block diagram of the power supply system according to the second embodiment of the present invention. The major different between the first embodiment in the FIG. 5A and the second embodiment in the FIG. 5B is that the control unit 80 is installed in the second power distribution panel DB2. Therefore, the second circuit breaking unit 62 and the control unit 80 in the second power distribution panel DB2 can be simultaneously monitored. Since the external line 200 shown in FIG. 5A, FIG. 5B does not involve the smart meter, the power supply system 100 includes the main circuit breaking unit 20.

Figure 5C:
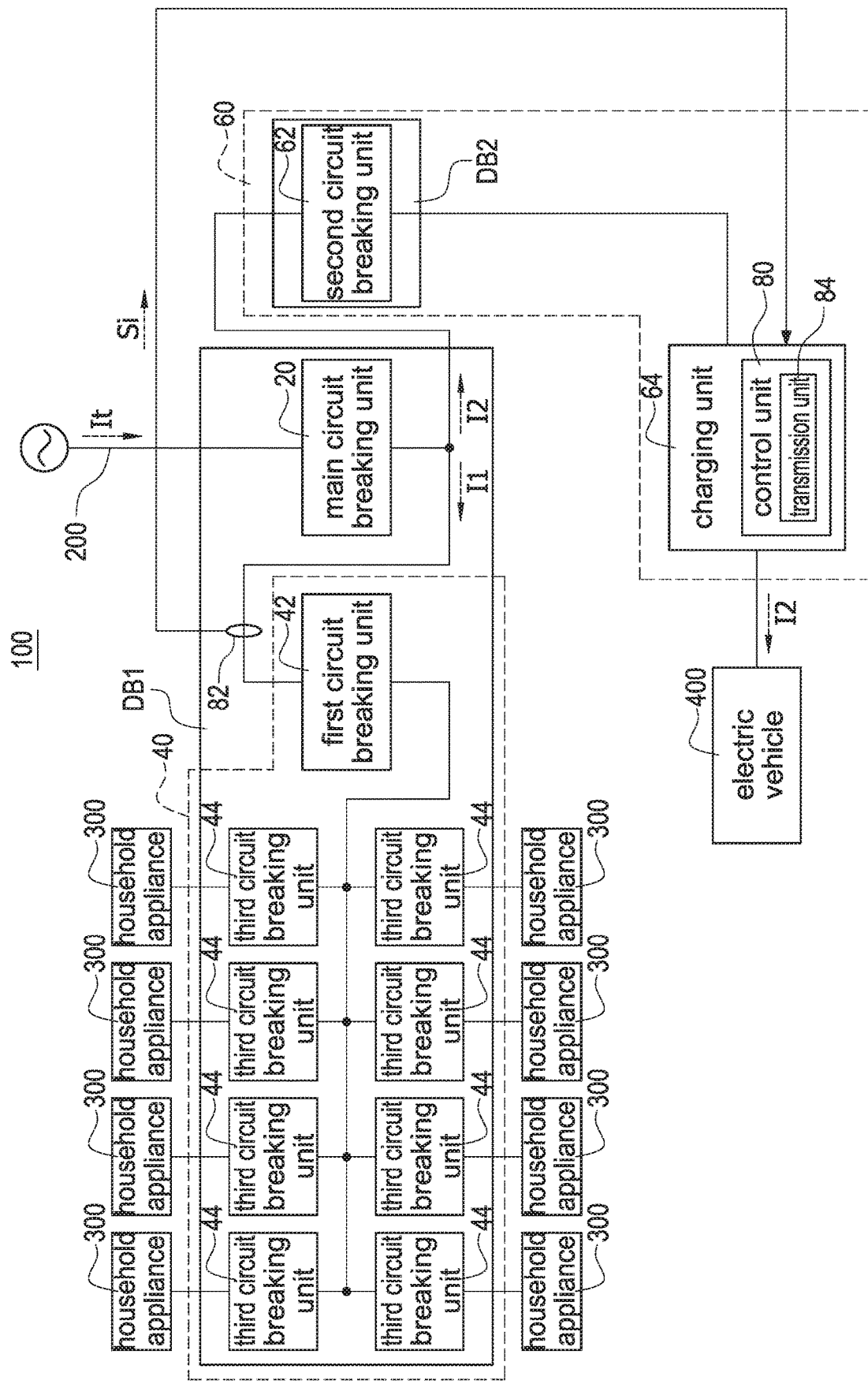
FIG. 5C shows a schematic structural block diagram of the power supply system according to the third embodiment of the present invention.
Figure 5D:
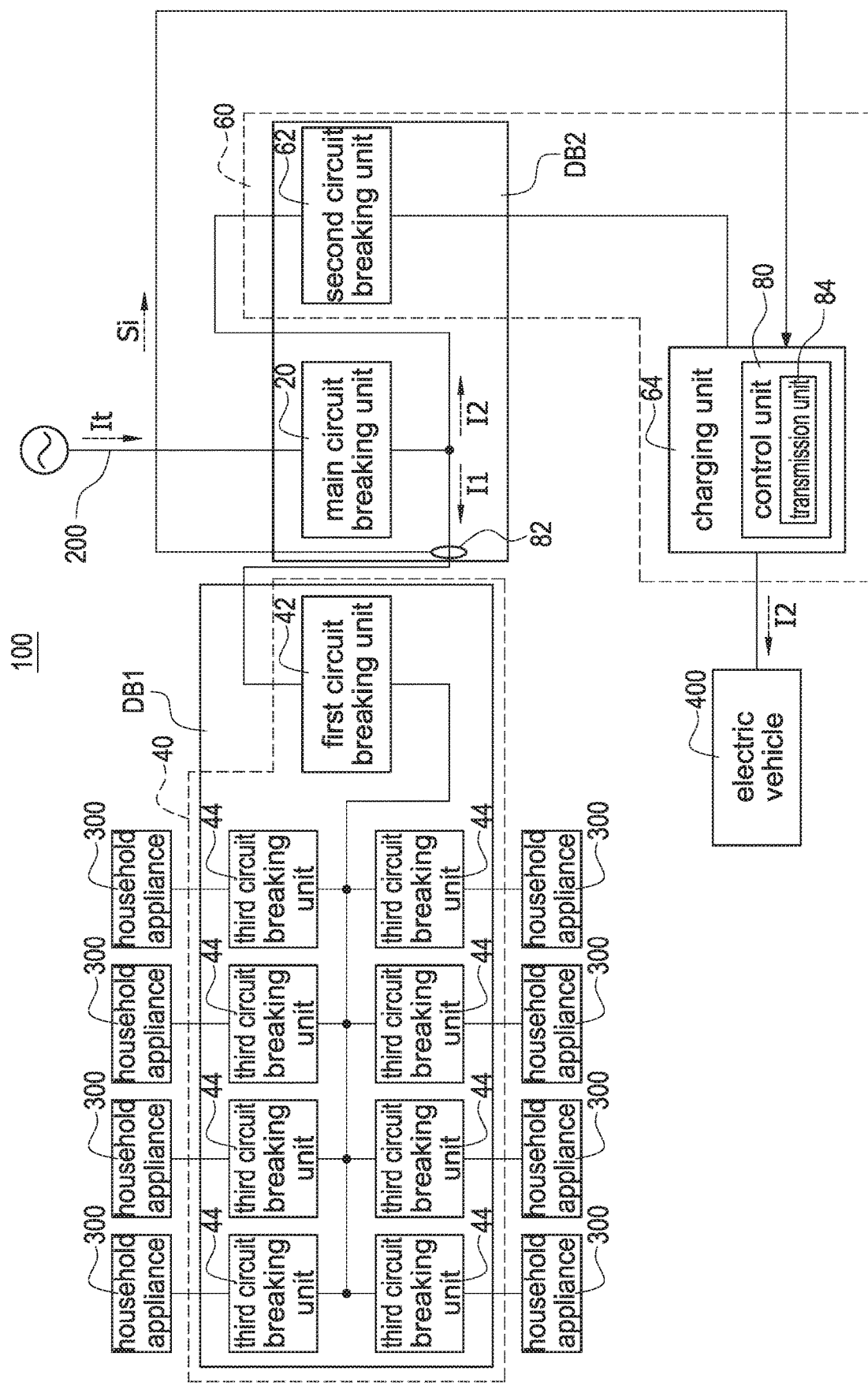
FIG. 5D shows a schematic structural block diagram of the power supply system according to the fourth embodiment of the present invention.

Refer to FIG. 5C and FIG. 5D, which show schematic structural block diagrams of the power supply system according to the third embodiment and the fourth embodiment of the present invention, respectively. In the two embodiments, the power supply system 100 is applied to the traditional electric grid and the power supply system 100 includes the main circuit breaking unit 20. As shown in FIG. 5C, the main circuit breaking unit 20 is contained in the first power distribution panel DB1. As shown in FIG. 5D, the main circuit breaking unit 20 is contained in the second power distribution panel DB2. In particular, the units and/or devices can be applied among different embodiments shown in FIG. 5A to FIG. 5D. In addition, the renewable energy unit 50 shown in FIG. 3 may be installed inside the first power distribution panel DB1 or installed outside the first power distribution panel DB1 and further connected to the power distribution branch 40 of the first power distribution panel DB1.

Figure 6:
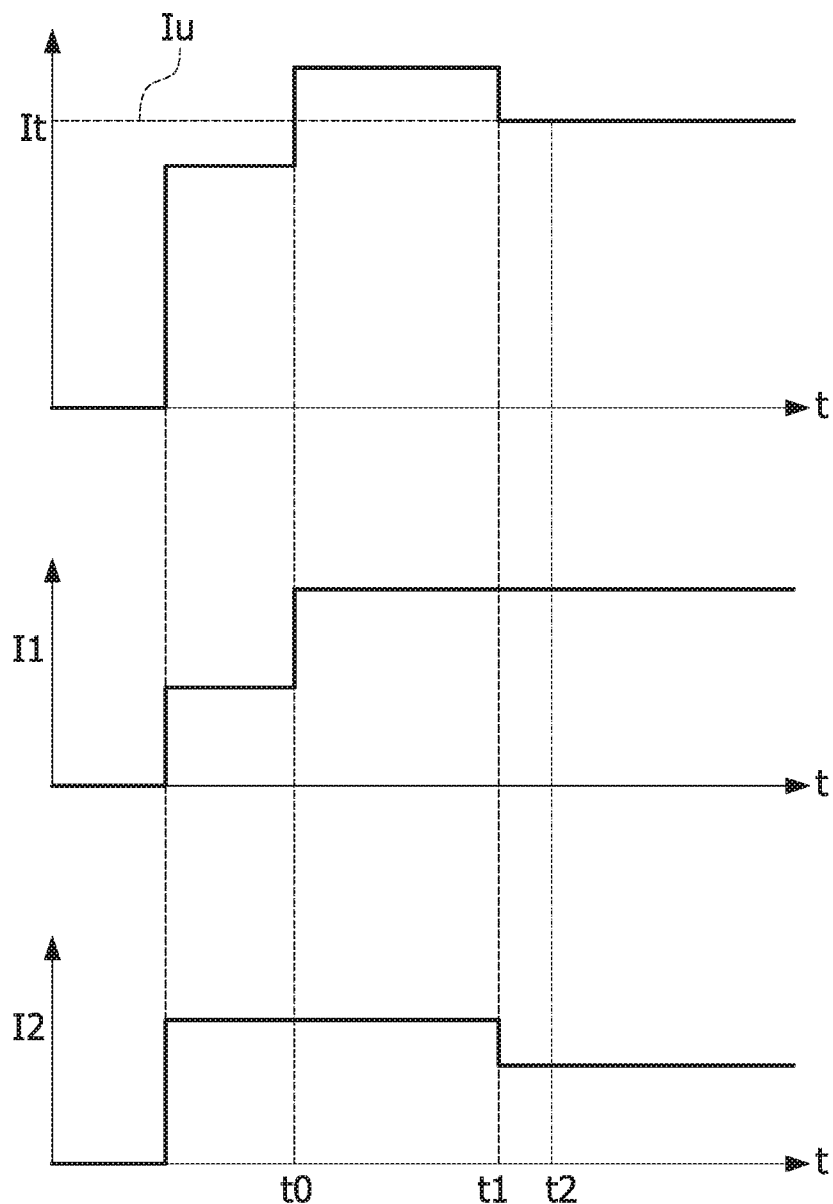
FIG. 6 shows a timing chart of controlling a power distribution branch and a charging branch according to the present invention.

Refer to FIG. 6, which shows a timing chart of controlling a power distribution branch and a charging branch according to the present invention. The timing chart shows the adjustment of the second current I2 of the charging branch 60 according to the first current I1 which becomes larger. At a time point t0, the total household current It increases since the first current I1 consumed by the power distribution branch 40 becomes larger. At this time, the control unit 80 receives that the first current I1 is increased according to the received current signal Si. During the time point t0 to a time point t1, the control unit 80 receives the current value of the first current I1 according to the current signal Si and calculates the current value of the second current I2 by subtracting the first current I1 from the upper-limit current of the contract power Iu, thus acquiring the charging command Ci corresponding to the second current I2. Also, the control unit 80 provides the charging command Ci to the charging unit 64. After the charging unit 64 receives the charging command Ci, the control unit 80 controls the charging unit 64 to decrease the second current I2 before the time point t1 to make the total household current It below the upper-limit current of the contract power Iu, thus avoiding continuously exceeding the contract power resulted in overloading electricity. For the conventional power supply system, at least two current measurement units are used to sample currents and calculate the sampled currents. Before the next charging command is provided to the charging unit, the control unit must communicate with the charging unit to confirm the next charging command so that the second current I2 starts to decrease at a time point t2 shown in FIG. 6. In the present invention, the charging command Ci is corresponding to the second current I2 which is calculated by subtracting the first current I1 from the upper-limit current of the contract power Iu and the charging command Ci is directly provided to the charging unit 64 to charge the electric vehicle 400 without confirming the previous charging command to the charging unit 64, thus significantly increasing charging efficiency due to the reduction of current-sampling time, calculation time, and communication time (from time point t1 to time point t2) between the control unit 80 and the charging unit 64. In this embodiment, FIG. 6 shows that the first current I1 becomes larger at the time point t0 and the second current I2 is decreased at the time point t1. In contrast to FIG. 6, when the first current I1 becomes smaller at the time point t0 and the second current I2 is increased at the time point t1.

Figure 7:
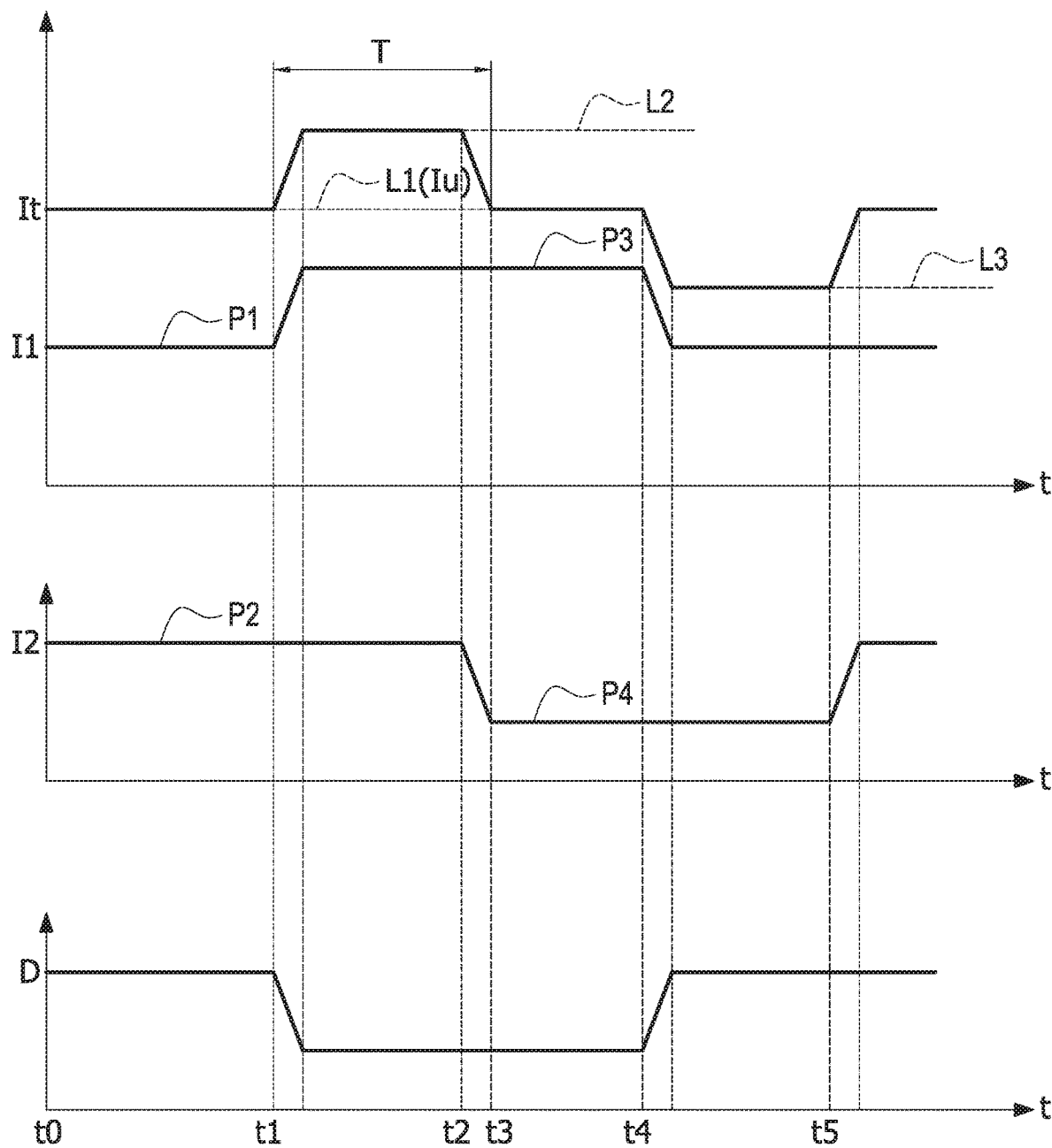
FIG. 7 shows a timing chart of controlling the power supply system according to the present invention.

Refer to FIG. 7, which shows a timing chart of controlling the power supply system according to the present invention. The timing chart shows the adjustment of the second current I2 of the charging branch 60 according to the first current I1 which becomes larger and then smaller. When the first current I1 drawn by the household appliances 300 becomes larger, the control unit 80 outputs the charging command Ci to the charging unit 64 for adjusting the second current I2. During a time point t0 to a time point t1, a current value of the first current I1 is equal to a first constant value P1. At this time, the control unit 80 does not output the charging command Ci to the charging unit 64 so that a current value of the second current I2 is equal to a second constant value P2. Also, the external line 200 supplies the total household current It, which equals to the sum of the first current I1 and the second current I2, through the main circuit breaking unit 20 to the household appliances 300 and the electric vehicle 400. At this time, a current value of the total household current It is maintained at a first current level L1, and the first current level L1 equals to the upper-limit current of the contract power Iu. During the time point t1 to a time point t2, when the control unit 80 receives that the first current It drawn by the household appliances 300 becomes larger according to the current signal Si, the control unit 80 outputs the charging command Ci to the charging unit 64. The charging unit 64 adjusts the duty cycle of the control signal to decrease for charging the electric vehicle 400. However, the second current I2 is not immediately reduced due to a time delay when the duty cycle of the control signal for charging the electric vehicle 400 is reduced to the charging current for charging the electric vehicle 400 is substantially reduced. Therefore, the total household current It is correspondingly increased at a second current level L2 since the first current I1 becomes larger.

During the time point t2 to a time point t4, the second current I2 becomes smaller than a fourth constant value P4 since the charging current for charging the electric vehicle 400 is substantially reduced such that the total household current It is decreased with the second current I2. At this time, the first current I1 drawn by the household appliances 300 is not changed (varied), namely the first current I1 is still maintained at the third constant value P3. During the time point t4 to a time point t5, the control unit 80 receives that the first current I1 is reduced to the first constant value P1 so as to transmit the charging command Ci to the charging unit 64 for increasing the duty cycle of the control signal transmitted from the charging unit 64 to the electric vehicle 400. However, the second current I2 is not immediately reduced due to a time delay when the duty cycle of the control signal for charging the electric vehicle 400 is increased to the charging current for charging the electric vehicle 400 is substantially increased. Therefore, the total household current It is correspondingly reduced at a third current level L3 since the first current I1 becomes smaller. After a period of time, the second current I2 is increased to the second constant value P2 since the charging current for charging the electric vehicle 400 is substantially increased, and the total household current It is increased to the first constant value P1. Accordingly, the power supply system 100 can control the time of exceeding the contract power within a desired range so as to avoid overloading operations and make the charging current as close as possible to the contract power. As shown in FIG. 7, the control unit 80 controls the charging unit 64 to decrease the second current I2 when the first current I1 is increased; on the contrary, the control unit 80 controls the charging unit 64 to increase the second current I2 when the first current I1 is decreased.

After the control unit 80 receives the current signal Si of the first current I1 measured by the current measurement unit 82, the second current I2 is decided according to the above-mentioned formula (1) and the charging command Ci corresponding to the second current I2 is also decided. Afterward, the control unit 80 transmits the charging command Ci to the charging unit 64 for charging the electric vehicle 400. Therefore, the control unit 80 can directly provide the charging command Ci corresponding to the adjustment value of the second current I2 to charge the electric vehicle 400 without confirming the previous charging command to the charging unit 64. In other words, the adjusted second current I2 is a total charging current for charging the electric vehicle 400. Therefore, the time period from a varied time point to a completed time point can be shortened, where the first current I1 starts to vary at the varied time point and the second current I2 is completely adjusted at the completed time point. As shown in FIG. 7, the varied time point is the time point t1 that the first current I1 drawn by the household appliances 300 starts to increase, and the completed time point is the time point t3 that the second current I2 is adjusted to small enough by the charging unit 64. In particular, the time period from the varied time point, such as the time point t1 to the completed time point, such as the time point t4 is referred to as a delay time T, and the delay time T may be preferably set less than or equal to 10 seconds. The charging unit 64 can directly adjust (decrease) the second current I2 within the delay time T after the first current I1 is varied (increased) so as to ensure that the total power consumption of the power supply system 100 is less than or equal to the upper-limit current of the contract power Iu.

In addition, the delay time T may be preferably set less than or equal to 10 seconds. In fact, the delay time is related to types and specifications of the control unit 80, the current measurement unit 82, the charging unit 64, and/or the electric vehicle 400.

Figure 8:
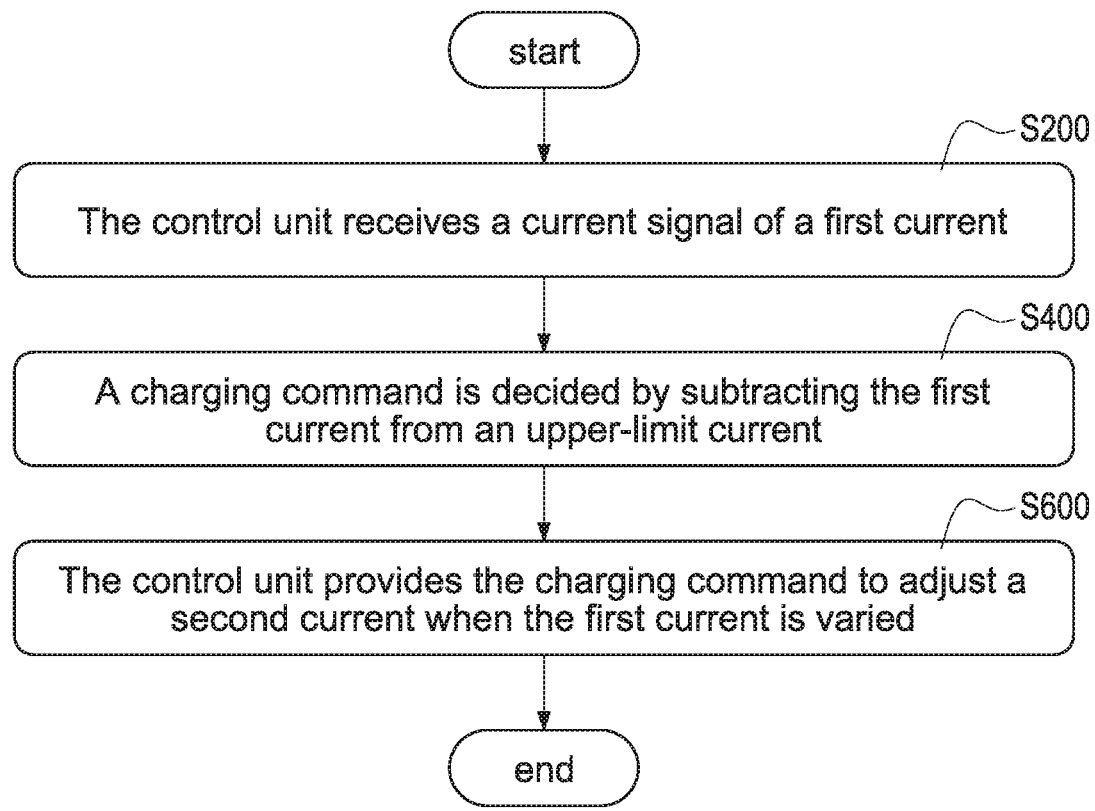
FIG. 8 shows a flowchart of a method of operating the power supply system according to the present invention.

FIG. 8 shows a flowchart of a method of operating the power supply system according to the present invention. The power supply system 100 receives a total household current It involving a first current I1 and a second current I2. The first current I1 is supplied to a plurality of household appliances 300 connected to a power distribution branch 40 and the second current I2 is supplied to an electric vehicle 400 connected to a charging branch 60. The power distribution branch 40 includes a first circuit breaking unit 42 and a plurality of third circuit breaking units 44. The household appliances 300 are correspondingly connected to the third circuit breaking units 44 and draw a first current I1. The charging branch 60 includes a second circuit breaking unit 62 and a charging unit 64. The charging unit 64 is connected to the electric vehicle 400 and delivers the second current I2 to charge the electric vehicle 400. Moreover, the total household current It is limited to below an upper-limit (maximum) power of the contract capacity signed with the electric power company. Therefore, a sum of the first current I1 and the second current I2, namely the total household current It, is limited to less than or equal to the upper-limit current of the contract power Iu. The method of operating the power supply system includes following steps. First, the control unit 80 receives a current signal of the first current I1 (S200). The control unit 80 receives the current signal Si of the first current I1 measured by a current measurement unit 82 to receive a current value of the first current I1. Afterwards, a charging command Ci is decided by subtracting the first current I1 from the upper-limit current of the contract power Iu (S400). The second current I2 is calculated by subtracting the first current I1 from the upper-limit current of the contract power Iu, thus acquiring the charging command Ci corresponding to the second current I2. Afterward, the control unit 80 outputs the charging command Ci to the charging unit 64. Finally, the control unit 80 provides the charging command Ci to adjust the second current I2 when the first current I1 is varied (S600). When the control unit 80 receives that the first current I1 is varied according to the current signal Si, the control unit 80 calculates an adjustment value of the second current I2 according to the variation value of the first current I1. The control unit 80 produces the charging command Ci according to the adjustment value of the second current I2 and transmits the charging command Ci to the charging unit 64. The charging unit 64 adjusts the second current I2 according to the charging command Ci. The charging command Ci is a control signal for adjusting the second current I2. In particular, the charging unit 64 adjusts the second current I2 according to the control signal transmitted from the control unit 80 to the charging unit 64. The control unit 80 outputs the charging command Ci to the charging unit 64 according to the variation of the first current I1. The charging unit 64 adjusts the second current I2 according to the charging command Ci such that the total power consumption of the power supply system 100 is less than or equal to the upper-limit current of the contract power Iu. When the first current I1 becomes larger, the control unit 80 outputs the charging command Ci corresponding to the control signal to control the charging unit 64 for decreasing the second current I2. On the contrary, the control unit 80 outputs the charging command Ci corresponding to the control signal to control the charging unit 64 for increasing the second current I2 when the first current I1 becomes smaller. Therefore, the control unit 80 can directly provide the charging command Ci corresponding to the adjustment value of the second current I2 to charge the electric vehicle 400 without confirming the previous charging command to the charging unit 64. In other words, the charging unit 64 can adjust the second current I2 to decrease within in a delay time T shown in FIG. 7 after the first current I1 becomes larger such that the total power consumption of the power supply system 100 is less than or equal to the upper-limit current of the contract power Iu. In particular, the delay time T is set less than or equal to 10 seconds.

In conclusion, the present invention has the following advantages:

1. The power distribution branch 40 and the charging branch 60 of the power supply system 100 are separately configured, that is, the power distribution branch 40 and the charging branch 60 do not affect each other, thus effectively controlling the total power consumption of the power distribution branch 40;

2. The current of charging the electric vehicle 400 does not involve into the power distribution branch 40 related to the household appliances 300, thus effectively controlling the total power consumption of the power distribution branch 40;

3. The power supply system 100 can use only one current measurement unit to measure the current signal of the first current I1 in the power distribution branch 40, thus effectively controlling the power distribution branch 40 and the charging branch 60 and reducing the costs of the power supply system 100; and 4. The charging command Ci is directly provided to the charging unit 64 to charge the electric vehicle 400 without confirming the previous charging command to the charging unit 64, thus significantly increasing charging efficiency due to the reduction of current-sampling time, calculation time, and communication time between the control unit 80 and the charging unit 64.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A power supply system between a power distribution branch for household appliances and a charging branch for an electric vehicle, the power supply system comprising:
   a power distribution branch configured to receive a first current, wherein the first current is a total current required by all household appliances in the power supply system;
   a current measurement unit configured to measure a current signal of the first current;
   a charging branch comprising a charging unit, and the charging branch configured to receive a second current for charging an electric vehicle through the charging unit; and
   a control unit connected to the charging unit, and configured to receive the current signal of the first current consumed by the power distribution branch;
   wherein the control unit is configured to produce a charging command corresponding to the second current and provide the charging command to the charging unit, wherein the control unit is configured to calculate the second current by directly subtracting the first current from an upper-limit value of a total household current;
   wherein the control unit is configured to adjust a duty cycle of the charging command to adjust the second current when the first current is varied so that a sum of the first and second currents is equal to the upper-limit value of the total household current, and the charging unit is configured to directly provide the second current to the electrical vehicle according to the charging command received without confirming a previous charging command.

2. The power supply system in claim 1, wherein the control unit is configured to calculate the second current by subtracting the first current from the upper-limit value of the total household current, and transmit the charging command corresponding to the second current to the charging unit.

3. The power supply system in claim 1, wherein the control unit is configured to directly provide the charging command to correspondingly adjust the second current according to the variation value of the first current when the control unit receives that the first current consumed by the power distribution branch is varied.

4. The power supply system in claim 3, wherein the charging command is a control signal for adjusting the charging unit, and the charging unit is configured to adjust the second current according to the control signal.

5. The power supply system in claim 4, wherein when the first current becomes larger, the control unit is configured to output the charging command corresponding to the control signal to control the charging unit for decreasing the second current; when the first current becomes smaller, the control unit is configured to output the charging command corresponding to the control signal to control the charging unit for increasing the second current.

6. The power supply system in claim 4, wherein a delay time is defined as a time period from a varied time point to a completed time point, wherein the first current starts to vary at the varied time point and the second current is completely adjusted at the completed time point; when the first current becomes larger or smaller, the charging unit is configured to decrease or increase the second current within the delay time.

7. The power supply system in claim 1, wherein the power distribution branch comprises a first circuit breaking unit and a plurality of third circuit breaking units connected to the first circuit breaking unit; the charging branch comprises a second circuit breaking unit; when a current flowing through at least one of the third circuit breaking units is excessive, the at least one third circuit breaking unit is disconnected.

8. The power supply system in claim 7, further comprising:
   a first power distribution panel configured to contain the first circuit breaking unit and the third circuit breaking units; and
   a second power distribution panel configured to contain the second circuit breaking unit.

9. The power supply system in claim 8, wherein the control unit is contained in the second power distribution panel or integrated into the charging unit.

10. The power supply system in claim 7, further comprising:
    a main circuit breaking unit connected to the first circuit breaking unit and the second circuit breaking unit, and configured to receive the total household current;
    wherein the main circuit breaking unit is configured to deliver the total household current to the power distribution branch and the charging branch when the main circuit breaking unit is connected.

11. The power supply system in claim 1, wherein the control unit is configured to outwardly transmit information stored in the control unit through a transmission unit; or the control unit is externally monitored through the transmission unit.

12. The power supply system in claim 1, further comprising:
    a renewable energy unit connected to the power distribution branch.

13. A method of operating a power supply system between a power distribution branch for household appliances and a charging branch for an electric vehicle, the power supply system configured to deliver a first current to a power distribution branch and deliver a second current to the charging branch, wherein the first current is a total current required by all household appliances in the power supply system, the method comprising steps of:
    (a) receiving a current signal of the first current by a control unit from a current measurement unit;
    (b) producing a charging command by directly subtracting the first current from an upper-limit value of a total household current by the control unit and provide the charging command to a charging unit, wherein the charging command is corresponding to the second current; and
    (c) adjusting a duty cycle of the charging command to adjust the second current when the first current is varied so that a sum of the first and second currents is equal to the upper-limit value of the total household current, and the charging unit is configured to directly provide the second current to an electrical vehicle according to the charging command received without confirming a previous charging command.

14. The method of operating the power supply system in claim 13, wherein the step (c) further comprises a step of:
    (c1) directly providing the charging command to correspondingly adjust the second current according to the variation value of the first current by the control unit; wherein the charging command is a control signal for adjusting a charging unit of the charging branch.

15. The method of operating the power supply system in claim 14, wherein the step (c1) further comprises a step of:
    (c2) outputting the charging command corresponding to the control signal to control the charging unit by the control unit for decreasing the second current when the first current becomes larger; outputting the charging command corresponding to the control signal to control the charging unit by the control unit for increasing the second current when the first current becomes smaller.

16. The method of operating the power supply system in claim 15, wherein the step (c2) further comprises a step of:
    (c3) defining a delay time as a time period from a varied time point to a completed time point, wherein the first current starts to vary at the varied time point and the second current is completely adjusted at the completed time point.

* * * * *